United States Patent [19]
Guthrie et al.

[11] 3,877,971
[45] Apr. 15, 1975

[54] PHOTOCURABLE POLYENE-POLYTHIOL COMPOSITIONS CONTAINING THE ADDUCT OF DIALLYLMALATE AND TOLUENE DIISOCYANATE

[75] Inventors: James L. Guthrie, Ashton; Francis J. Rendulic, Ellicott City, both of Md.

[73] Assignee: W. R. Grace and Co., New York, N.Y.

[22] Filed: Aug. 14, 1974

[21] Appl. No.: 497,427

Related U.S. Application Data

[60] Division of Ser. No. 409,615, Oct. 25, 1973, which is a continuation-in-part of Ser. No. 209,369, Dec. 17, 1971, Pat. No. 3,787,303.

[52] U.S. Cl. ............ 427/53; 427/54; 204/159.15; 204/159.18; 204/159.19; 260/16; 260/31.8 M; 260/36.8 XA; 260/31.8 Z; 260/33.2 R; 260/45.95; 260/75 S; 260/75 UA; 260/829; 260/837 R; 260/861; 260/862; 260/865; 260/873

[51] Int. Cl. ......... B41j 1/10; B05c 5/00; B01j 1/12; B01j 1/10

[58] Field of Search..... 204/159.15, 159.14, 159.18, 204/159.19; 260/861, 862, 873, 79.5 R, 79, 75 S, 75 UA; 117/93.31

[56] References Cited
UNITED STATES PATENTS

| | | | |
|---|---|---|---|
| 3,625,925 | 12/1971 | Oswald et al. | 204/159.18 |
| 3,656,999 | 4/1972 | Lundsager | 260/79 |
| 3,661,744 | 5/1972 | Kehr et al. | 204/159.14 |
| 3,662,023 | 5/1972 | Kehr et al. | 260/79.5 |
| 3,787,303 | 1/1974 | Guthrie et al. | 204/159.15 |

*Primary Examiner*—Murray Tillman
*Assistant Examiner*—Richard B. Turer
*Attorney, Agent, or Firm*—Charles L. Harness

[57] ABSTRACT

The invention disclosed is directed to a method for overcoating which includes applying to a substrate a novel photocurable lacquer composition having as essential ingredients a polyene selected from a particular group of polyenes which contain at least 2 reactive unsaturated carbon-to-carbon bonds per molecule, a polythiol containing 2 or more thiol groups per molecule and a resin component; and thereafter exposing the applied composition to actinic radiation for a period of time sufficient to photocure the applied composition to provide an overcoating. Optionally, a sensitizer may be included if desired to decrease curing time and improve efficiency. The method is particularly useful for high speed overcoating printed metal articles such as cans. Overcoatings thus provided are found to be characterized by high strength, good scratch resistance, freedom from tackiness and excellent transparency.

6 Claims, No Drawings

PHOTOCURABLE POLYENE-POLYTHIOL COMPOSITIONS CONTAINING THE ADDUCT OF DIALLYLMALATE AND TOLUENE DIISOCYANATE

This application for U.S. Letters Patent is a division of Ser. No. 409,615, filed Oct. 25, 1973, which in turn is a continuation-in-part of Ser. No. 209,369, filed Dec. 17, 1971, now U.S. Pat. No. 3,787,303.

The present invention relates to a photocurable lacquer composition which includes a polyene component containing at least two unsaturated carbon-to-carbon bonds per molecule, a polythiol component containing on the average at least two —SH functional groups per molecule, and a resin component. The invention also provides a method for overcoating articles wherein an applied coating of the composition is cured by means of actinic radiation to produce a protective coating which is typically clear, tough and durable.

It is well known in the art that protective functional overlayers of transparent synthetic organic coating materials may be formed on various substrates. Typically, the prior art coating materials have been baked at high temperatures to form coatings on substrates, printed and non-printed. Many prior art coating materials contain various harmful solvents which are released as vapors upon baking. Not only do the released vapors present pollution problems, but also baking is costly and time consuming. Further, use of high bake temperatues often results in discoloration of inks or pigments disposed on the articles being coated. Generally, use of lower bake temperatures further slows the prior art lacquering processes, while use of higher temperatures further limits the types of inks which may be satisfactorily applied prior to applying protective overcoatings. In preparing printed cartons from printed paperboard, it is conventional to apply overcoatings such as heat-curable lacquers and press varnishes which, in practice, generally have required in process dusting with starch powders or the like and extended aging prior to making cartons from the overcoated sheets. For a broad description of the art, the reader is referred to U.S. Pat. Nos. 3,625,925 (Oswald, et al.), 3,656,999 (Lundsager), 3,661,744 and 3,662,023 (Kehr, et al.).

The above-cited application, U.S. Ser. No. 209,369, discloses an invention whereby printed or non-printed articles may be overlayered with a transparent protective coating in rapid, simple and efficient manner without requiring high temperatures or evolution of solvent vapor. Numerous defects of prior art overcoating compositions and methods may be effectively overcome by the invention which provides a clear coating composition and method for overcoating using actinic radiation to cure an applied coating of the composition. Upon exposure to actinic radiation, the composition cures rapidly to a typically clear coating which has good lubricity, withstands abrasion, exhibits high gloss, effectively adheres to a variety of substrates, and is substantially odorless. The method is especially useful for high-speed coating on metal substrates such as metal sheets, printed and non-printed, from which articles such as cans are formed. Upon curing, the composition effectively adheres to both the metal and to intermediate layers such as inks and the like which typically are disposed on the metal in the metal decorating field. Other printed substrates which may be coated using the method include magazine-quality paper and paperboard. Typically, printed paperboard may be coated using the method and thereafter passed to carton finishing operations without requiring aging and without need for dusting.

Generally stated, the present invention provides a method of overcoating which includes applying to a substrate a photocurable lacquer composition having (a) a polythiol component containing at least two —SH groups per molecule, (b) a polyene component selected from particular polyenes (subsequently set forth herein) which contain 2 or more terminally positioned unsaturated carbon-to-carbon bonds per molecule, contain at least one of the following: N, O, and six membered carbon containing ring, and are characterized in that they will react with the polythiol to form tough and durable coatings, and (c) a resin component. Optionally, a sensitizer component may be included if desired to decrease curing time and improve efficiency. Curing of the applied composition is effected by exposure to a free radical generator such as actinic radiation to form, typically, clear, tough, durable polythioether coatings.

Polyenes containing at least one of N, O, and six member carbon containing ring which are useful herein include triallyl isocyanurate; Bisphenol A diallyl ether; the diadduct of diallyl amine and Bisphenol A 4,4′-diglycidyl ether; the urethane diadduct of a member selected from the ene-ol group consisting of ally alcohol, diallyl malate, and trimethylolpropane diallyl ether and a member selected from the cyclic $C_6$ containing diisocyanate group consisting of toluene diisocyanate, 3,3′-dimethyl-4,4′-biphenylene diisocyanate, 3-isocyanatomethyl-3,5,5-trimethylcyclohexyl isocyanate, 4,4′-methylenebis-(cyclohexyl isocyanate), and Solithane 291 (trademark for a polyester isocyanate product by Thiokol having molecular weight of about 2,800 and prepared by reacting ethylene glycol, propylene glycol, adipic acid and toluene diisocyanate). The various polyenes may be obtained commercially or may be readily prepared from commercially available reactants. Methods exemplifying preparation of these polyenes are set forth subsequently in the examples included in this description. Preferred polyenes are triallyl isocyanurate, Bisphenol A diallyl ether and the diadduct of toluene diisocyanate and diallyl malate.

It has now been found that 2,4,6-tris(allyloxy)s-triazine is an excellent polyene component which is now included among the preferred polyenes.

The polythiol component has a molecular weight in the range from about 80 to about 20,000 and the general formula:

$$R_1 \text{---SH})_B$$

wherein $R_1$ represents a polyvalent organic moiety free from reactive carbon-to-carbon unsaturation and B is a numeral of at least 2. Thus, $R_1$ may contain cyclic groupings and hetero atoms such as N, P, or O and primarily contains carbon-to-carbon, carbon-hydrogen, carbon-oxygen or silicon-oxygen containing chain linkages free of any reactive carbon-to-carbon unsaturation. The ene/thiol mole ratio is selected so as to provide a solid, self-supporting cured product under ambient conditions in the presence of a free radical generator.

The polythiol may be a simple or complex organic compound having a multiplicity of pendant or terminally positioned -SH functional groups per average molecule.

On the average, the polythiol must contain 2 or more —SH groups/molecule and have a viscosity range of essentially 0 to 20 million centiposes (cps) at 70°C as measured by a Brookfield Viscometer either alone or when in the presence of an inert solvent, aqueous dispersion or plasticizer. Operable polythiols usually have molecular weights in the range about 100 to about 20,000, and preferably from about 200 to about 10,000.

One class of polythiols curable with polyenes to obtain essentially odorless polythioether products are esters of thiol-containing acids of the formula $HS—R_2—COOH$ where $R_2$ is an organic moiety containing no reactive carbon-to-carbon unsaturation with polyhydroxy compounds of structure $R_3$—$OH)_n$ where $R_3$ is an organic moiety containing no reactive carbon-to-carbon unsaturation, and $n$ is 2 or greater. These components will react under suitable conditions to give a polythiol having the general structure:

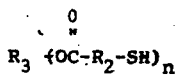

where $R_2$ and $R_3$ are organic moieties containing no reactive carbon-to-carbon unsaturation, and $n$ is 2 or greater.

Certain polythiols such as the aliphatic monomeric polythiols exemplified by ethane dithiol, hexamethylene dithiol, decamethylene dithiol, tolylene-2,4-dithiol, and the like, and some polymeric polythiols such as a thiol-terminated ethylcyclohexyl dimercaptan polymer, and the like, and similar polythiols which are conveniently and ordinarily synthesized on a commercial basis, although having obnoxious odors, are operable but many of the end products may not be widely accepted from a practical, commercial point of view.

The preferred polythiol compounds are characterized by a low level or mercaptan-like odor initially, and after reaction, give essentially odorless polythioether coatings which are commercially attractive and practically useful for both indoor and outdoor applications.

Examples of the polythiol compounds preferred because of relatively low odor level include but are not limited to esters of thioglycolic acid (HS—CH$_2$—COOH), 2-mercaptopropionic acid (HS—CH(CH$_3$)—COOH) and 3-mercaptopropionic acid (HS—CH$_2$CH$_2$COOH) with polyhydroxy compounds such as glycols, triols, tetraols, pentaols, hexaols, and the like. Specific examples of the preferred polythiols include but are not limited to ethylene glycol bis (thioglycolate), ethylene glycol bis (3-mercaptopropionate), trimethylolpropane tris (thioglycolate), trimethylolpropane tris (3-mercaptopropionate), pentaerythritol tetrakis (thioglycolate), pentaerythritol tetrakis (3-mercaptopropionate), all of which are commercially available, and pentaerythritol tris (3-mercaptopropyl ether), which may be prepared as set forth in the examples infra. A specific example of a preferred polymeric polythiol is polypropylene ether glycol bis (3-mercaptopropionate) which is prepared from polypropylene-ether glycol (e.g, Pluracol P2010, Wyandotte Chemical Corp.) and 3-mercaptopropionic acid by esterification.

Resins useful herein include normally solid, solvent soluble linear or branched polyesters, preferably linear, having molecular weight from about 500 to about 100,000 and preferably from about 1000 to about 50,000 which may be prepared by reacting a polybasic acid or a polybasic acid anhydride having the following general formulas I and II, respectively:

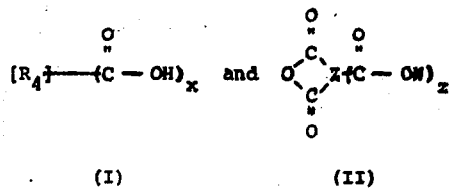

(I)          (II)

with a polyhydric alcohol having the general formula $[R_5—OH)_y$. In the formulas, $x$ and $y$ are numerals of 2 or more and preferably 2 to 4, and $R_4$ and $R_5$ are saturated or unsaturated hydrocarbyl or oxyhydrocarbyl groups having valence of $x$ and $y$ respectively and which may have from 2 to about 21 and from 2 to about 30 carbon atoms respectively, and preferably from 2 to about 10 and from 2 to about 8 carbon atoms respectively; $z$ is 0 or 1; Z is a saturated or unsaturated hydrocarbyl group having a valence of 2 when $z$ is 0, a valence of 3 when $z$ is 1, and from about 2 to about 12 carbon atoms and preferably from 2 to about 6 carbon atoms. Typically, the reaction is carried out using about one equivalent weight of ol functionality per one equivalent weight of acid functionality.

The polybasic acid or anhydride reactant may be, for example, phthalic acid or phthalic anhydride, maleic acid or maleic anhydride, adipic acid, trimellitic acid or trimellitic anhydride, succinic acid or succinic anhydride, fumaric acid, terephthalic acid, itaconic acid, glutaric acid, isophthalic acid, the tribasic Diels-Alder adduct of levopimaric acid with maleic acid, 1,4,5,8-naphthalenetetracarboxylic acid, and mixtures thereof.

The polyhydric alcohol reactant may be, for example, ethylene glycol, diethylene glycol, polyethylene glycol, propylene glycol, dipropylene glycol, polypropylene glycol, 1,3-propanediol, 1,4-butanediol, neopentyl glycol, pentaerythritol (a tetraol), glycerol, trimethylolpropane (a triol), Bisphenol A (4,4-isopropylidenediphenol), and 1,4-dihydroxymethylbenzene.

Resins preferred herein are solvent-soluble normally solid polyester products prepared by esterifying saturated or unsaturated $C_2$ to about $C_8$ hydrocarbyl or oxyhydrocarbyl diols, triols, tetraols or mixtures thereof with one or more dibasic, and tetrabasic saturated or unsaturated $C_2$ to about $C_{10}$ hydrocarbyl carboxylic acids, their anhydrides and mixtures thereof. The acid or anhydride reactants useful in preparing such resins include phthalate ester forming acids of anhydrides, i.e., phthalic acid, phthalic anhydride, isophthalic acid, terephthalic acid, trimellitic acid, trimellitic anhydride or mixtures thereof in amounts constituting a percentage of the total acid and/or acid anhydride reactants effective for aiding in providing overcoatings characterized by high strength, good scratch resistance and substantial freedom from tackiness. Polyesters prepared from acid or anhydride reactants comprising from about 5 to 100 parts by weight of phthalate ester forming acids, acid anhydrides or mixtures thereof per 100 parts by weight of the total hydrocarbyl acid or anhydride reactants are found suitable. Preferably phthalate ester forming acids, acid anhydrides or mixtures thereof are included in an amount from about 50 to 100 parts by weight.

Another especially effective phthalate containing polyester may be prepared by reacting phthalic acid or phthalic anhydride, maleic acid or maleic anhydride, adipic acid, and diethylene glycol using mole ratios of the reactants in the order given of about 3:1:1:5 to provide about 1 equivalent weight of acid or anhydride functionality per about 1 equivalent weight of functionality. The above molar ratio, corresponding to about 65 parts by weight of phthalic anhydride per 100 parts by weight total hydrocarbyl acid, may be varied to provide residual acid, anhydride or ol functionality for subsequent capping of the resin as described subsequently herein.

Other soluble resins which are useful herein are polyester-polyenes which may be prepared by capping the polyester resins described hereinabove with a member having the general formula III which follows:

(III) 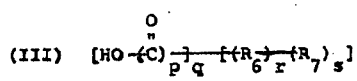

wherein $R_6$ is a hydrocarbyl member free of remotely internal non-aromatic ene and yne functionality and having a valence of q plus s and from about 2 to about 10 and preferably from about 2 to about 7 carbon atoms; p is 0 or 1; q is a numeral from 1 to 10 and preferably 1 to about 2; r is 0 or 1; s is a numeral from 1 to 10 and preferably 1 to about 2. Typically, where p is 0, the sums of numerals y in the formula $[R_5—OH]_y$ supra and q are approximately equal to (a) x in the formula I supra where the polyesters are prepared from a polybasic acid or (b) 2 plus z in the formula II supra where the polyesters are prepared from a polybasic acid anhydride; and where p is 1, q is approximately the number required for y to equal (c) the sum of q plus x where the polyesters are prepared from a polybasic acid or (d) the sum of q plus 2 plus z where the polyesters are prepared from a polybasic anhydride. Alternatively stated, the number of ester-forming ol groups is typically approximately equal to the number of ester-forming carbonyl groups in the preparation of the capped polyesters. As used in the description supra regarding the formula III and in the claims which follow, the term "remotely internal" means disposed more than 8 carbon atoms from the 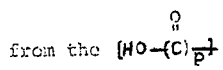

moiety.

In the above formula III, $R_7$ may be selected from the group consisting of:

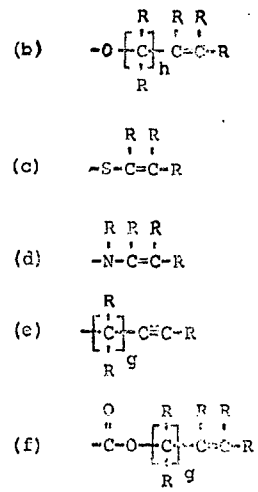

where q is 0 or an integer from 1 to 9 and preferably 0 or 1; h is 0 or 1; and the various R members are radicals which may be selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, and cycloalkyl and substituted cycloalkyl, where the substituents on the substituted members are selected from the group consisting of nitro, chloro, fluoro, acetoxy, acetamide, phenyl, benzyl, alkyl, alkoxy and cycloalkyl. Alkyl and alkoxy have from 1 to 9 carbon atoms and cycloalkyl has from 3 to 8 carbon atoms. Preferably, R is selected from the group consisting of hydrogen and methyl.

Useful capping agents include, for example, allyl alcohol, trimethylolpropane diallyl ether, diallyl malate, diallyl tartrate, 2-vinyloxyethanol, vinyl hydroxyethyl sulfide, 10-undecylenyl alcohol, allyl maleate, allyl phthalate, diallyl trimellitate, N-methyl-N-vinylethanolamine, 4-vinyloxybenzyl alcohol, and acrylic acid. The capping agents may be obtained commercially or readily prepared from commercially available reactants using well known methods. In order that the use of formula III in selecting capping agents will be more fully apparent, the capping agents set forth above are classified in the table below. Polyester-polyenes preferred herein are the reaction products prepared by capping the preferred polyester resins with one or more of the useful capping agents set forth supra.

The polyester-polyene resin has a molecular weight in the range from about 100 to 20,000, preferably about 200 to about 10,000, and a viscosity in the range from essentially 0 to 20 million centipoises at 70°C as measured by a Brookfield Viscometer. The polyester-polyene is characterized by having at least two unsaturated carbon-to-carbon bonds disposed at terminal or near terminal positions on a main chain of the molecular or pendant therefrom.

TABLE

| Capping Agent | $R_6$ | $R_7$ | R | p | q | r | s | g | h |
|---|---|---|---|---|---|---|---|---|---|
| Allyl alcohol | — | $CH_2=CH-CH_2-$ (a) | H | 0 | 1 | 0 | 1 | 1 | — |
| Acrylic acid | — | $CH_2=CH-$ (a) | H | 1 | 1 | 0 | 1 | 0 | — |

Table—Continued

| Capping Agent | $R_6$ | $R_7$ | R | p | q | r | s | g | h |
|---|---|---|---|---|---|---|---|---|---|
| 10-undecylenic alcohol | - | $CH_2=CH(CH_2)_9$ (a) | H | 0 | 1 | 0 | 1 | 9 | - |
| 4-vinyloxybenzyl alcohol | $-\langle O \rangle-CH_2$ | $CH_2=CH-$ (a) | H | 0 | 1 | 1 | 1 | 0 | - |
| 2-vinyloxyethanol | $-CH_2-CH_2-$ | $CH_2=C(H)O-$ (b) | H | 0 | 1 | 1 | 1 | - | 0 |
| Trimethylolpropane diallyl ether | $H_3C-CH_2C(CH_2)_3$ | $CH_2=CH-CH_2-O-$ (b) | H | 0 | 1 | 1 | 2 | - | 1 |
| Vinyl hydroxyethyl sulfide | $-CH_2-CH_2-$ | $CH_2=CH-S$ (c) | H | 0 | 1 | 1 | 1 | - | - |
| N-methyl-N-vinyl-ethanolamine | $-CH_2-CH_2-$ | $CH_2=CH-N-$ with $CH_3$ (d) | H on C's $CH_3$ on N | 0 | 1 | 1 | 1 | - | - |
| Allyl maleate | $-CH=CH-$ | $CH_2=CH-CH_2-O-\overset{O}{\underset{\parallel}{C}}-$ (f) | H | 1 | 1 | 1 | 1 | 1 | - |
| Allyl phthalate | $-\langle O \rangle-$ | $CH_2=CH-CH_2-O-\overset{O}{\underset{\parallel}{C}}-$ (f) | H | 1 | 1 | 1 | 1 | 1 | - |
| Diallyl trimellitate | $-\langle O \rangle-$ | $CH_2=CH-CH_2-O-\overset{O}{\underset{\parallel}{C}}-$ (f) | H | 1 | 1 | 1 | 2 | 1 | - |
| Diallyl malate | $-CH_2-CH-$ | $CH_2=CH-CH_2-O-\overset{O}{\underset{\parallel}{C}}-$ (f) | H | 0 | 1 | 1 | 2 | 1 | - |
| Diallyl tartrate | $-CH-CH-$ | $CH_2=CH-CH_2-O-\overset{O}{\underset{\parallel}{C}}-$ (f) | H | 0 | 2 | 1 | 2 | 1 | - |

It is found that the polyester-polyene resin is co-curable, i.e., upon exposing the lacquer to a free radical generator such as actinic radiation the polyester-polyene reacts with a portion of the polythiol in the manner generally analogous to the polyene component to form polythioether linkages. Advantageously, however, the polyester-polyenes generally minimize the amount of polythiol necessary to effect curing of the lacquer composition to solid durable overcoatings.

The polyester-polyenes are disclosed in copending Guthrie application, "Curable Liquid Pigment Composition and Method," Ser. No. 188,608, filed Oct. 12, 1971, assigned to the same assignee hereof and incorporated herein in pertinent part by reference.

Other resins which may be included in the present lacquer composition include, for example, carbohydrates, preferably sucrose octa-acetate and sucrose acetate-butyrate. Still other resins useful herein include, for example, polyvinyl acetate, polyvinyl alcohol, polystyrene, esters of abietic acid, polymers of α-or β-pinene, indenecoumarone copolymers, and the like.

Other resins which may usefully be included in the lacquer composition are liquid plasticizers such as polyethylene glycol having molecular weight of up to about 400, dioctyl phosphate, dibutyl phthalate and the like.

The resin component may be included in any effective amount. Generally, the resin may suitably be included in an amount from about 1 to about 50 parts by weight, and preferably from about 10 to about 50 parts by weight, per 100 parts by weight of polyene-polythiol combination.

The polyene has two or more reactive unsaturated carbon-to-carbon bonds located terminal from the main chain. The polythiol has two or more thiol groups per molecule. After the polyene, polythiol and resin are combined and if desired, with additional materials, as may be required, the curable lacquer composition is applied to a substrate which may be printed and thereafter exposed to a free radical generator such as actinic radiation to give an essentially odorless solid elastomeric overcoating. Although as a practical matter, actinic radiation is preferred, it is recognized that chemical free radial generating reagents may be employed as well as high energy radiation bombardment.

Although the mechanism of the curing reaction is not completely understood, it appears most likely that the curing reaction may be initiated by almost any chemical free radical generating reagent which dissociates or abstracts a hydrogen atom from an SH group, or accomplishes the equivalent thereof.

Generally the rate of the curing reaction may be increased by increasing the temperature of the composition at the time of initiation of cure. In many applications, however, the curing is accomplished conveniently and economically by operating at ordinary room temperature conditions.

The present curable lacquer compositions are characterized by insensitivity to visible light, rendering them generally free from setting on, for example, apparatus which may be used to apply the composition to a substrate. Upon exposure to actinic light, the present lacquer compositions are found to be rapidly curable making them eminently suitable for use in high speed coating operations.

A class of actinic light useful herein for curing is ultraviolet light and other forms of actinic radiation which are normally found in radiation emitted from the sun or from artificial sources such as type RS sunlamps, carbon arc lamps, xenon arc lamps, mercury vapor lamps, tungsten halide lamps and the like. Ultraviolet radiation may be used most efficiently if the curable lacquer composition contains a suitable photocuring rate accelerator. Ultraviolet radiation having a wave length from about 100 to about 4,000 Angstroms, and preferably from about 2,200 to about 4,000 Angstroms, is suitable.

Curing periods may be adjusted to be very short and hence commercially economical by proper choice of ultraviolet source, photocuring rate accelerator and concentration thereof, temperature and molecular weight, and reactive group functionality of the polyene and polythiol. Curing periods of less than about 1 second duration are possible in preparing lacquer coatings having thickness in the range from about 0.1 to about 0.5 mil and even to about 2 mils in some applications.

Conventional curing inhibitors or retarders which may be used in order to stabilize the components of the curable lacquer compositions so as to prevent premature onset of curing may include hydroquinone; p-tert.-butyl catechol; 2,6-ditert.-butyl-p-methylphenol; phenothiazine; N-phenyl-2-naphthylamine; inert gas atmospheres such as helium, argon, nitrogen and carbon dioxide; vacuum; and the like. Acidic stabilizers such as phosphorus acid and the like may be usefully employed.

It is further understood that the polyene and the polythiol may be formed in situ in the photocurable lacquer composition without departing from the spirit of this invention.

Specifically useful herein are chemical photocuring rate accelerators such as benzophenone, acetophenone, azobenzene, acenaphthene-quinone, o-methoxy benzophenone, Thioxanthen-9-one, xanthen-9-one, 7-H-Benz [de] anthracen-7-one, dibenzosuberone, 1-napththaldehyde 4,4'-bis (dimethylamino) benzophenone, fluorene-9-one, 1'-acetonaphthone, 2'-acetonaphthone, anthraquinone, 1-indanone, 2-tert.-butyl anthraquinone, valerophenone, hexanophenone, 8-phenyl-butyrophenone, p-morpholinopropiophenone, 4-morpholino-benzophenone, 4'-morpholinodeoxybenzoin, p-diacetylbenzene, 4-aminobenzophenone, 4'-methoxyacetophenone, benzaldehyde, α-tetralone, 9-acetylphenanthrene 2-acetylphenanthrene, 10-thioxanthenone, 3-acetylphenanthrene, 3-acetylindole, 1,3,5-triacetylbenzene and the like, including blends thereof to greatly reduce the exposure times.

The curing rate accelerators are usually added in an amount ranging from about 0.0005 to about 50 percent by weight of the photocurable lacquer composition, with a preferred range being from about 0.05 to about 25 percent by weight. Preferred photocuring rate accelerators are the aldehyde and ketone carbonyl compounds having at least one aromatic nucleus attached directly to the $$-\overset{|}{\underset{|}{C}}=O \text{ group.}$$

group.

The relative amounts of polyene and polythiol included in the photocurable lacquer composition are selected such that the mole ratio of ene:thiol is from about 0.2:1 to about 5:1, and preferably from about 0.75:1 to about 1.5:1.

Practice of the present invention will be further illustrated by the following non-limiting examples wherein all parts and percentages given are by weight unless indicated otherwise.

EXAMPLE 1

275 grams (1.86 moles) of phthalic anhydride, 60.8 grams (0.62 mole) of maleic anhydride, 90.5 grams (0.62 mole) of adipic acid, and 328 grams (3.09 moles) of diethylene glycol were heated in a vessel for three hours at 200°C. The resulting polyester resin product was cooled and removed from the vessel. A photocurable lacquer composition was prepared by mixing at 50°C 10 grams of the resin (a solid at 25°C) with 10 grams (0.04 mole) of triallyl isocyanurate, 14 grams (0.03 mole) of pentaerythritol tetrakis (3-mercaptopropionate), 0.5 gram of benzophenone, 0.025 gram of phosphorous acid, and 0.05 gram of Irganox 1076 (trademark for a hindered phenol antioxidant product by Geigy Industrial Chemicals). The mixture was heated to 70°C to dissolve the benzophenone producing a clear homogeneous mixture having a viscosity in the range of 12,000 to 18,000 cps and a pH in the range of 4.5 to 5.5.

The photocurable lacqure was applied at 25°C to steel can body stock having a red printing ink printed thereon by conventional techniques. The lacquer was applied as a liquid film having a thickness of 0.2 to 0.4 mil using a conventional roller coater. The area of application included the printed area plus adjacent non-printed portions of the steel. The applied liquid film was exposed to ultraviolet light using a 5,000 watt Hanovia lamp positioned 4 inches from the film. Exposure was for 3 to 5 seconds, during which time the liquid film cured to a clear solid coating which was found to be characterized with high gloss, strong bonding to both the printed ink and steel, and excellent abrasion resistance.

EXAMPLE 2

A polyester resin was prepared at 200°C. using the resin preparation of Example 1 except that, prior to cooling, 4.3 grams (0.02 mole) of trimethylolpropane diallyl ether was added and the temperature of the reactants was increased to 240°C, which temperature was maintained for one hour. The resin product was cooled and removed from the vessel. Analysis of the product showed it to be a polyester-tetraene which was a solid at 25°C. A curable lacquer composition was prepared by mixing 10 grams of this polyester-tetraene at 60°C with 10 grams (0.04 mole) of triallyl isocyanurate, 14 grams (0.03 mole) of pentaerythritol tetrakis (3-mercaptopropionate), 0.5 gram of benzophenone, 0.025 gram of phosphorus acid and 0.05 gram of Irganox 1076. This lacquer composition was applied as a film on printed steel can body stock and thereafter cured using this application and curing procedures of Example 1. The cured lacquer coating was found to be characterized with good clarity, high gloss, strong bonding to the printed ink and the steel, and excellent abrasion resistance.

EXAMPLE 3

12 grams of commercially available polyethylene glycol having a molecular weight of 400 was mixed with 10 grams of triallyl isocyanurate, 14 grams of pentaerythritol tetrakis (3-mercaptopropionate), 0.5 gram of benzophenone, 0.025 gram of phosphorus acid, and 0.05 gram of Irganox 1076. The resulting photocurable lacquer composition was roller-coated at 20 to 30°C onto paperboard having ink printed theron. The area of lacquer application included printed and non-printed areas. The coated paperboard was exposed to ultraviolet light using a 5,000 watt Hanovia lamp positioned 3 inches from the paperboard. Exposure was for 3 to 5 seconds, during which time the lacquer cured to a clear solid coating which was found to be characterized with high gloss, strong bonding to both the printed ink and the paperboard, and excellent abrasion resistance.

EXAMPLE 4

10 grams of liquid polyester resin "LB 104-45" (commercially available from Marco Chemical Div. of W. R. Grace and Co.) was mixed with 10 grams of 2,4,-6-tris(allyloxy)s-triazine, 14 grams of pentaerythritol tetrakis (3-mercaptopropionate), 0.5 gram of benzophenone, 0.025 gram of phosphorous acid, and 0.05 gram of Irganox 1076. A thin film of the resulting photocurable lacquer composition was applied to ink-printed and non-printed areas of steel can body stock using a roller. Next, the film was cured using the curing procedure of Example 1. The cured lacquer coating was found to be characterized with good clarity, high gloss, strong bonding to the printed ink and the steel, and excellent abrasion resistance.

EXAMPLE 5

A curable lacquer composition was prepared by mixing at 55°C 10 grams of the polyester-tetraene resin of Example 2 with 10 grams (0.04 mole) of triallyl isocyanurate, 10 grams of Bisphenol A diallyl ether, 23 grams of pentaerythritol tetrakis (3-mercaptopropionate), 0.5 gram of dibenzosuberone and 0.05 gram of Irganox 1076. This lacquer composition was applied as a 3-mil film on printed steel can body stock and thereafter cured using the application and curing procedures of Example 1. The cured lacquer coating was found to be characterized with good clarity, high gloss, strong bonding to the printed ink and steel and excellent abrasion resistance.

EXAMPLE 6

A photocurable lacquer was prepared at 65°C by mixing 10 grams of the polyester-tetraene resin of Example 2 with 31 grams of Bisphenol A diallyl ether,, 24 grams of pentaerythritol tetrakis (3-mercaptopropionate), 1 gram of benzophenone and 0.05 gram of Irganox 1076. This photocurable lacquer was applied at 25°-30°C to steel can body stock having ink printed thereon. The lacquer was applied as a liquid film with a thickness of 0.3 to 0.5 mil using a conventional roller coater. The area of application included the printed area plus adjacent non-printed portions of the steel. The applied liquid film was exposed to ultraviolet light, using a 4,000 watt Ferro lamp positioned 3 to 4 inches from the film. Exposure was for 3–5 seconds, during which time the liquid film cured to a clear solid coating which was found to be characterized with high gloss, strong bonding to both the printed ink and the steel, and excellent abrasion resistance.

EXAMPLE 7

A photocurable lacquer was prepared at 60°C by mixing 10 grams of the polyester-tetraene resin of Example 2 with 31 grams of Bisphenol A diallyl ether, 24 grams of pentaerythritol tetrakis (3-mercaptopropyl ether), 2 grams of benzophenone, and 0.05 gram of Irganox 1076. A thin film of this photocurable lacquer composition was applied at 25°C to magazine quality paper having ink printed thereon. The lacquer was applied as a liquid film having a thickness of 0.05 to 0.1 mil using a conventional roller coater. The area of application included the printed area plus non-printed portions of the paper. The applied liquid film was exposed to ultraviolet light using a 5,000 watt Hanovia lamp positioned 4 inches from the film. Exposure was for about 3 seconds, during which time the liquid film cured to a clear solid coating which was found to be characterized with high gloss, strong bonding to both the printed ink and the paper, and excellent abrasion resistance.

EXAMPLE 8

459 grams (3.1 moles) of phthalic anhydride and 296 grams (3.09 moles) of ethylene glycol were heated in a vessel for 4 hours at 190°C. Next, 4.28 grams (0.02 mole) of trimethylolpropane diallyl ether was added. The temperature of the reactants was increased to 230°C, which temperature was maintained for 1 hour. The resin product was cooled and removed from the vessel. Analysis of the product showed it to be a polyester-tetraene which was a solid at 25°C. A curable lacquer composition was prepared by mixing 12 grams of this polyester-tetraene at 50°C. with 10 grams of triallyl isocyanurate, 14 grams of pentaerythritol tetrakais (3-mercaptopropionate), 0.5 gram of benzophenone, 0.025 gram of phosphorus acid, and 0.05 gram of Irganox 1076. This lacquer composition was applied as a thin film at 25° to 30°C on printed steel can body stock and thereafter cured using the application and curing procedures of Example 1. The cured lacquer coating was found to be characterized with good clarity, high gloss, strong bonding to the printed ink and the steel and excellent abrasion resistance.

EXAMPLE 9

To a resin kettle maintained under a nitrogen atmosphere and equipped with a condenser, stirrer, thermometer and gas inlet and outlet was added 174 grams (1 mole) of toluene diisocyanate, 428 grams (2 moles) of diallyl malate, along with 0.3 gram of stannous octoate as catalyst, and the reaction was continued for 2 hours at 60°c. 20 grams of the thus formed tetraene diadduct of diallyl malate and toluene diisocyanate was combined with 16..3 grams of pentaerythritol tetrakis (3-mercaptopropionate), 15 grams of the resin of Example 8, 0.5 gram of benzophenone and 0.05 gram of Irganox 1076. A thin photocured lacquer coating was formed of this photocurable lacquer composition on printed steel can body stock using the application and curing procedures of Example 1. The cured lacquer coating was characterized with good clarity, high gloss, excellent abrasion resistance and strong bonding to both the printed ink and the steel.

EXAMPLE 10

The procedure of Example 9 was repeated except that 528 grams (2 moles) of 3,3'-dimethyl-4,4'-biphenylene diisocyanate was substituted for the toluene diisocyanate. The results were substantially the same.

EXAMPLE 11

The procedure of Example 9 was repeated except that 358 grams (2 moles) of 3-isocyanatomethyl-3,5,5-trimethylcyclohexyl isocyanate was substituted for the toluene diisocyanate. The results were substantially the same.

EXAMPLE 12

The procedure of Example 9 was repeated except that 500 grams (2 moles) of 4,4'-methylenebis(cyclohexyl isocyanate) was substituted for the toluene diisocyanate. The results were substantially the same.

EXAMPLE 13

The procedure of Example 9 was repeated except that 116 grams (2 moles) of allyl alcohol was substituted for the diallyl malate. The results were substantially the same.

EXAMPLE 14

The procedure of Example 9 was repeated except that 430 grams (2 moles) of trimethylol propane diallyl ether was substituted for the diallyl malate. The results were substantially the same.

EXAMPLE 15

343 grams (1.1 mole) of 4,4'-diglycidyl ether of Bisphenol A (commercially available under the name Epon 828 by Shell Chemical Co.) was charged to a dry resin kettle maintained under nitrogen and equipped with a condenser, stirrer, thermometer and gas inlet and outlet. 190 grams (2 moles) of diallyl amine was added to the kettle and the reaction was continued with stirring for 3 hours at 70°C. A photocurable lacquer composition was prepared at 55°C by mixing 12.6 grams of the thus formed tetraene diadduct with 122 grams of pentaerythritol tetrakis (3-mercaptopropionate), 10 grams of the polyester-tetraene resin of Example 2, 1 gram of dibenzosuberone and 0.05 gram of Irganox 1076. A film of this photocurable lacquer composition was applied to printed steel can body stock and thereafter cured using the coating and curing procedures of Example 1. The results were substantially the same.

EXAMPLE 16

To a resin kettle maintained under a nitrogen atmosphere and equipped with a condenser, stirrer, thermometer and a gas inlet and outlet was added 179 gram (1 mole) of 3-isocyanatomethyl-3,5,5-trimethylcyclohexyl isocyanate. 116 grams (2 moles) of allyl alcohol was added and the reaction was continued for 4 hours at 90°C with stirring. 100 grams of the resulting diene diadduct of allyl alcohol with the 3-isocyanatomethyl-3,5,5-trimethylcyclohexyl isocyanate was mixed with 83.5 grams of pentaerythritol tetrakis (3-mercaptopropyl ether), 40 grams of the polyester-tetraene resin prepared in Example 8, 2 grams of dibenzosuberone, and 0.2 gram of Irganox 1076. This photocurable lacquer composition was applied as a film and thereafter cured on steel can body stock having ink printed thereon using the application and curing procedures of Example 1. The results were substantially the same.

EXAMPLE 17

4.3 grams (0.2 mole) of trimethylolpropane diallyl ether was added to a resin kettle maintained under a nitrogen atmosphere having a condenser, stirrer, thermometer, and gas outlet and inlet. Next, 264 grams (1 mole) of 3,3'-dimethyl-4,4'-phenylene diisocyanate and 0.5 gram of dibutyl tin dilaurate catalyst were added. Reaction was continued for 5 hours at 120°C with stirring. 20 grams of the resulting tetraene diadduct was mixed with 16 grams of pentaerythritol tetrakis (3-mercaptopropionate), 10 grams of the polyester-tetraene resin of Example 2, 1 gram of dibenzosuberone and 0.1 gram of Irganox 1076. A cured coating of this photocurable lacquer composition was formed on printed steel can body stock using the application and curing procedures of Example 1. The results were substantially the same.

EXAMPLE 18

275 grams (1.86 moles) of phthalic anhydride, 60.8 grams (0.62 mole) of maleic anhydride, 90.5 grams (0.62 mole) of adipit acid, and 328 grams (3.09 moles) of diethylene glycol were heated in a vessel for three hours at 200°C. The resulting polyester resin product was cooled and removed from the vessel. A photocurable lacquer composition was prepared by mixing at 50°C, 10 grams of the resin (a solid at 25°C) with 9.8 grams (0.04 mole) of 2,4,6-tris(allyloxy)-s-triazine, 14 grams (0.03 mole) of pentaerythritol tetrakis (3-mercaptopropionate), 0.5 gram of benzophenone, 0.025 gram of phosphorous acid, and 0.05 gram of Irganox 1076 (trademark for a hindered phenol antioxidant product by Geigy Industrial Chemicals). The mixture was heated to 70°C to dissolve the benzophenone producing a clear homogeneous mixture having a viscosity in the range of 12,000 to 18,000 cps and a pH in the range of 4.5 to 5.5.

The photocurable lacquer was applied at 25°C to steel can body stock having a red printing ink printed thereon by conventional techniques. The lacquer was applied as a liquid film having a thickness of 0.2 to 0.4 mil using a conventional roller coater. The area of application included the printed area plus adjacent nonprinted portions of the steel. The applied liquid film was exposed to ultraviolet light using a 5,000 watt Hanovia lamp positioned 4 inches from the film. Exposure was for 3 to 5 seconds, during which time the liquid film cured to a clear solid coating which was found to be characterized with high gloss, strong bonding to both the printed ink and the steel, and excellent abrasion resistance.

EXAMPLE 19

A polyester resin was prepared at 200°C. using the resin preparation procedure of Example 1 except that, prior to cooling, 4.3 grams (0.02 mole) of trimethylolpropane diallyl ether was added and the temperature of the reactants was increased to 240°C, which temperature was maintained for one hour. The resin product was cooled and removed from the vessel. Analysis of the product showed it to be a polyester-tetraene which was a solid at 25°C. A curable lacquer composition was prepared by mixing 10 grams of this polyester-tetraene at 60°C with 9.8 grams (0.04 mole) of 2,4,6-tris(allyloxy)s-triazine, 14 grams (0.03 mole) of pentaerythritol tetrakis (3-mercaptopropionate), 0.5 gram of benzophenone, 0.025 gram of phosphorous acid and 0.05 gram of Irganox 1076. This lacquer composition was applied as a film on printed steel can body stock and thereafter cured using the application and curing procedures of Example 1. The cured lacquer coating was found to be characterized with good clarity, high gloss, strong bonding to the printed ink and the steel, and excellent abrasion resistance.

EXAMPLE 20

12 grams of commercially available polyethylene glycol having a molecular weight of 100 was mixed with 9.8 grams of 2,4,6-tris(allyloxy)s-triazine, 14 grams of pentaerythritol tetrakis (3-mercaptopropionate), 0.5 gram of benzophenone, 0.025 gram of phosphorous acid, and 0.05 gram of Irganox 1076. The resulting photocurable lacquer composition was roller-coated at 20° to 30°C onto paperboard having ink printed thereon. The area of lacquer application included printed and non-printed areas. The coated paperboard was exposed to ultraviolet light using a 5,000 watt Hanovia lamp positioned 3 inches from the paperboard. Exposure was for 3 to 5 seconds, during which time the lacquer cured to a clear solid coating which was found to be characterized with high gloss, strong bonding to both the printed ink and the paperboard, and excellent abrasion resistance.

EXAMPLE 21

10 grams of liquid polyester resin "LB 104-45" (commercially available from Marco Chemical Div. of W. R. Grace and Co.) was mixed with 9.8 grams of 2,4-,6-tris(allyloxy)s-triazine, 14 grams of pentaerythritol tetrakis (3-mercaptopropionate), 0.5 gram of benzophenone, 0.025 gram of phosphorous acid, and 0.05 gram of Irganox 1076. A thin film of the resulting photocurable lacquer composition was applied to ink-printed and non-printed areas of steel can body stock using a roller. Next, the film was cured using the curing procedure of Example 1. The cured lacquer coating was found to be characterized with good clarity, high gloss, strong bonding to the printed ink and the steel, and excellent abrasion resistance.

EXAMPLE 22

A curable lacquer composition was prepared by mixing at 55°C, 10 grams of the polyester-tetraene resin of Example 2 with 9.8 grams (0.04 mole) of 2,4,6-tris(allyloxy)s-triazine, 10 grams of Bisphenol A diallyl ether, 23 grams of pentaerythritol tetrakis (3-mercaptopropionate), 0.5 gram of benzosuberone and 0.05 gram of Irganox 1076. This lacquer composition was applied as a 3-mil film on printed steel can body stock and thereafter cured using the application and curing procedures of Example 1. The cured lacquer coating was found to be characterized with good clarity, high gloss, strong bonding to the printed ink and steel and excellent abrasion resistance.

EXAMPLE 23

459 grams (3.1 moles) of phthalic anhydride and 296 grams (3.09 moles) of ethylene glycol were heated in a vessel for 4 hours at 190°C. Next, 4.28 grams (0.02 mole) of trimethylolpropane diallyl ether was added. The temperature of the reactants was increased to 230°C, which temperature was maintained for 1 hour. The resin product was cooled and removed from the vessel. Analysis of the product showed it to be a polyester-tetraene which was a solid at 25°C. A curable lacquer composition was prepared by mixing 12 grams of this polyester-tetraene at 50°C with 9.8 grams of 2,4,6-tris(alloxy)s-triazine, 14 grams of pentaerythritol tetrakis (3-mercaptopropionate), 0.5 gram of benzophenone, 0.025 gram of phosphorous acid, and 0.05 gram of Irganox 1076. This lacquer composition was applied as a thin film at 25° to 30°C on printed steel can body stock and thereafter cured using the application and curing procedures of Example 1. The cured lacquer coating was found to be characterized with good clarity, high gloss, strong bonding to the printed ink and the steel and excellent abrasion resistance.

EXAMPLE 24

To a resin kettle maintained under a nitrogen atmosphere and equipped with a condenser, stirrer, thermometer and gas inlet and outlet was added 174 grams (1 mole) of toluene diisocyanate, 428 grams (2 moles) of diallyl malate, along with 0.3 gram of stannous octoate as catalyst, and the reaction was continued for 2 hours at 60°C. 20 grams of the thus formed tetraene diadduct of diallyl malate and toluene diisocyanate was combined with 16.3 grams of pentaerythritol tetrakis (3-mercaptopropionate(, 15 grams of the copped resin of Example 2, 0.5 gram of benzophenone and 0.05 gram of Irganox 1076. A thin photocured lacuqer coating was formed of this photocurable lacquer composition on printed steel can body stock using the application and curing procedures of Example 1. The cured lacquer coating was characterized with good clarity, high gloss, excellent abrasion resistance and strong bonding to both the printed ink and the steel.

EXAMPLE 25

The procedure of Exampel 24 was repeated except that 18 grams of the resin of Example 1 was substituted for the ene capped resin. The cured lacquer coating was characterized with good clarity, high gloss, excellent abrasion resistance and strong bonding to both the printed ink and the steel.

EXAMPLE 26

The procedure of Example 24 was repeated except that the trimethlolpropane diallyl ether was replaced by 2.32 grams (0.04 mole) of allyl alcohol. The cured lacquer coating was characterized with good clarity, high gloss, strong bonding to the printed ink and the steel, and excellent abrasion resistance.

EXAMPLE 27

The procedure of Example 24 was repeated except that the trimethylolpropane diallyl ether was replaced by 2.88 grams (0.04 mole) of acrylic acid. The cured lacquer coating was characterized with good clarity, high gloss, strong bonding to the printed ink and the steel, and excellent abrasion resistance.

EXAMPLE 28

The procedure of Example 24 was repeated except that the trimethylolpropane diallyl ether was repalced by 2.80 grams (0.04 mole) of 10-undecylenic alcohol. The cured lacquer coating was characterized with good clarity, high gloss, strong bonding to the printed ink and the steel, and excellent abrasion resistance.

EXAMPLE 29

The procedure of Example 24 was repeated except that the trimethylolpropane diallyl ether was replaced by 6.0 grams (0.04 mole) of 4-vinyloxybenzyl alcohol. The cured lacquer coating was characterized with good clarity, high gloss, strong bonding to the printed ink and the steel, and excellent abrasion resistance.

EXAMPLE 30

The procedure of Example 24 was repeated except that the trimethylolpropane diallyl ether was replaced by 3.48 grams (0.04 mole) of 2-vinyloxyethanol. The cured lacquer coating was characterized with good clarity, high gloss, strong bonding to the printed ink and the steel, and excellent abrasion resistance.

EXAMPLE 31

The procedure of Example 24 was repeated except that the trimethylolpropane diallyl ether was replaced by 8.24 grams (0.04 mole) of vinyl hydroxyethyl sulfide. The cured lacquer coating was characterized with good clarity, high gloss, strong bonding to the printed ink and the steel, and excellent abrasion resistance.

EXAMPLE 32

The procedure of Example 24 was repeated except that the trimethylolpropane diallyl ether was replaced by 4.04 grams (0.04 mole) of N-methyl-N-vinyl-ethanolamine. The cured lacquer coating was characterized with good clarity, high gloss, strong bonding to the printed ink and the steel, and strong abrasion resistance.

EXAMPLE 33

The procedure of Example 24 was repeated except that the trimethylolpropane diallyl ether was replaced by 7.84 grams (0.04 mole) of allyl maleate. The cured lacquer coating was characterized with good clarity, high gloss, strong bonding to the printed ink and the steel, and strong abrasion resistance.

EXAMPLE 34

The procedure of Example 24 was repeated except that the trimethylolpropane diallyl ether was replaced by 9.84 grams (0.04 mole) of allyl phthalate. The cured lacquer coating was characterized with good clarity, high gloss, strong bonding to the printed ink and the steel, and strong abrasion resistance.

EXAMPLE 35

The procedure of Example 24 was repeated except that the trimethylolpropane diallyl ether was replaced by 5.80 grams (0.02 mole) of diallyl trimellitate. The cured lacquer coating was characterized with good clarity, high gloss, strong bonding to the printed ink and the steel, and strong abrasion resistance.

EXAMPLE 36

The procedure of Example 24 was repeated except that the trimethylolpropane diallyl ether was replaced by 4.28 grams (0.02 mole) of diallyl malate. The cured lacquer coating was characterized with good clarity, high gloss, strong bonding to the printed ink and the steel, and strong abrasion resistance.

EXAMPLE 37

The procedure of Example 24 was repeated except that the trimethylolpropane diallyl ether was replaced by 4.60 grams (0.02 mole) of diallyl tartrate. The cured lacquer coating was characterized with good clarity, high gloss, strong bonding to the printed ink and the steel, and strong abrasion resistance.

EXAMPLES 38–62

The procedures of Examples 1 to 25 inclusive were repeated separately except that the pentaerythritol tetrakis (3-mercaptopropionate) of Examples 1 to 6, 8 to 15, and 17 to 25 and pentaerythritol tetrakis (3-mercaptopropyl ether) of Examples 7 and 16 were replaced by trimethylolpropane tris (3-mercaptopropionate) in amounts providing approximately equivalent amounts of thiol groups in the polythiol components. Thus, for example, about 1.1 grams of trimethylolpropane tris (3-mercaptopropionate) was used per one gram of pentaerythritol tetrakis (3-mercaptopropionate) since these polythiols have thiol equivalent weights of about 122 and 133, respectively. The results were substantially the same as the results for Examples 1 to 25.

The following examples illustrates a method for preparing pentaerythritol tris (3-mercaptopropyl) ether.

EXAMPLE 63 a. Preparation of Triallyl Ether of Pentaerythritol

Into a 5 liter three-necked flask fitted with condenser and addition funnel was placed a solution of 650 g. (16.25 equivalents) of sodium hydroxide in 650 ml. of water. To this was added 272 g. (two moles) of pentaerythritol. This mixture was stirred by means of a magnetic bar and heated to 70°C. Then 1,936 g. (1,385 ml., 16 moles) of allyl bromide was added over an eight-hour period at such a rate that the temperature stayed between 70° and 80°C. Following this, heating was resumed, keeping the temperature at 80°–82°C for an additional four hours. Volatile materials were removed by distillation at atmospheric pressure until the temperature of the condensing vapor reached 98°C.

One liter of water was added to the hot residue (to prevent crystallization of the salts). The product was cooled to room temperature and the layers were separated. The water layer was extracted twice with 300 ml. portions of diethyl ether. The combined organic layers were dried over anhydrous magnesium sulfate and then distilled at atmospheric pressure to remove the diethyl ether. The triallyl ether of pentaerythritol product weighed 451 g. (88% conversion) and had a boiling range of 120°–121°C at 1 mm., $n_D^{24}$ 1.4625. The infrared and NMR spectra were those expected for the triallyl ether of pentaerythritol.

b. Conversion of Triallyl Ether to Trithiol

Ten drops of tert-butyl hydroperoxide was added to 85.2 g. (1 equivalent of saturation) of pentaerythritol triallyl ether (prepared above) in a 500 ml. flask equipped with a condenser and magnetic stirrer. This mixture was heated to 40°C, and 76 g. (1 mole) of thiolacetic acid was added during one hour at such a rate that the temperature did not exceed 90°C. After the addition was complete, the product was kept at 80°C for an hour and then allowed to cool to room temperature overnight.

To the product was added a solution of 100 g. (2.5 eq) of sodium hydroxide in 200 ml. of water. This mixture was heated under reflux for three hours and then cooled to room temperature and diluted with 300 ml. of ether to facilitate separation of the layers. After separation, the water layer was acidified to pH 2–5 with HCl and then extracted twice with 400 ml. portions of ether. Ether was evaporated from the combined organic layers, and the residue was diluted with an equal volume of toluene. The resulting solution was washed with 5% aqueous sodium bicarbonate, then with 5% aqueous hydrochloric acid, and with water. The toluene and other volatile contaminants were removed by distillation at 0.1 mm. Hg until the temperature of the residue reached 225°C. The product (pentaerythritol tris (3-mercaptopropyl) ether) weighed 119 g. (100% conversion) and had a mercaptan content of 7.09 meq/q. This is 84.6% of the theoretical amount.

Part of the trithiol was distilled at 0.1 mm. Hg. The distillate had a boiling range of 243°–245°C and a mercaptan content of 7.88 meq/g. (94% of theoretical value).

It is understood that the foregoing detailed description is given merely by way of illustration and that numerous variations can be made therein without departing from the spirit or scope of the present invention.

What is claimed is:

1. A photocurable lacquer composition comprising (A) a polythiol component containing at least 2 —SH groups per molecule; (B) as a polyene component, the diadduct of diallyl malate and toluene diisocyanate; the mole ratio of ene to thiol being from about 0.2:1 to about 5:1; (C) from about 0.0005 to about 50 percent by weight of the composition of a photocuring rate accelerator component; (D) from 1 to about 50 parts by weight per 100 parts by weight of the polyene-polythiol combination of a normally solid, solvent soluble polyester component having a molecular weight from about 500 to about 100,000 prepared by reacting (i) a polybasic acid having the general formula $$[R_4]\text{---}(C\text{-}OH)_x$$
$$\overset{\|}{O}$$

where $R_4$ is a saturated or unsaturated hydrocarbyl group having valence of $x$ and from 2 to about 21 carbon atoms and $x$ is at least 2 or (ii) a polybasic acid anhydride having the general formula

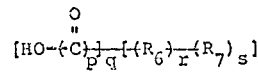

where $z$ is 0 or 1, Z is a saturated or unsaturated hydrocarbyl group having from about 2 to about 12 carbon atoms and a valence of 2 when $z$ is 0 and a valence of 3 when $z$ is 1 with (iii) a polyhydric alcohol having the general lformula $[R_5\text{---}OH]_Y$ where $R_5$ is a saturated or unsaturated hydrocarbyl or oxyhydrocarbyl group having a valence of $y$ and from 2 to about 30 carbon atoms and $y$ is at least 2.

2. The photocurable lacquer composition of claim 1 wherein the polyester component is prepared by capping the product of the reaction of (i) or (ii) and (iii) with a member having the general formula $$[HO\text{-}(C)\!\!\underset{p}{\overset{\|}{\phantom{C}}}\!\!]_q\text{-}[(R_6)_r\text{-}(R_7)_s]$$

wherein $R_6$ is a hydrocarbyl member free of remotely internal non-aromatic ene and yne functionality and having a valence of $q$ plus $s$ and from about 2 to about 10 carbon atoms; $p$ is 0 or 1; $q$ is a numeral from 1 to 10; $r$ is 0 or 1; $s$ is a numeral from 1 to 10; and $R_7$ is selected from the group consisting of

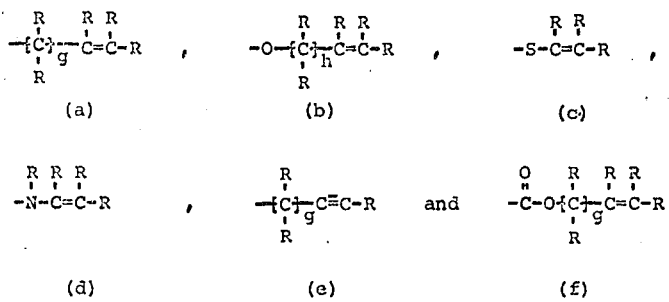

where $g$ is 0 or an integer from 1 to 9; $h$ is 0 or 1; and the various R radicals are selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, and cycloalkyl and substituted cycloalkyl, where the substituents on the substituted members are selected from the group consisting of nitro, chloro, fluoro, acetoxy, acetamide, phenyl, benzyl, alkyl, alkoxy and cycloalkyl, the alkyl and alkoxy groups having from 1 to 9 carbon atoms and the cycloalkyl groups having from 3 to 8 carbon atoms.

3. The method for overcoating which comprises applying to a substrate the lacquer composition of claim 1, and thereafter exposing the applied composition to actinic radiation for a period of time sufficient to photocure the composition.

4. The method for overcoating which comprises applying to a substrate the lacquer composition of claim 2, and thereafter exposing the applied composition actinic radiation for a period of time sufficient to photocure the composition.

5. The method of claim 3 wherein the applied composition is from about 0.1 to about 2 mils in thickness.

6. The method of claim 3 wherein the lacquer composition is applied to a substrate printed with ink.

* * * * *

UNITED STATES PATENT OFFICE
CERTIFICATE OF CORRECTION

PATENT NO. : 3 877 971
DATED : April 15, 1975
INVENTOR(S) : James L. Guthrie and Francis J. Rendulic It is certified that error appears in the above-identified patent and that said Letters Patent are hereby corrected as shown below:

In column 20, line 5, correct "general 1formula $[R_5-OH)_y$" to read: --general formula $[R_5]-(OH)_y$--.

In column 20, line 60, after "composition" insert --to--.

Signed and Sealed this twenty-sixth Day of August 1975

[SEAL]

Attest:

RUTH C. MASON
*Attesting Officer*

C. MARSHALL DANN
*Commissioner of Patents and Trademarks*